United States Patent [19]

Strong

[11] 4,217,884
[45] Aug. 19, 1980

[54] COLLECTION AND UTILIZATION OF SOLAR ENERGY

[76] Inventor: John D. Strong, 136 Gray St., Amherst, Mass. 01002

[21] Appl. No.: 900,344

[22] Filed: Apr. 27, 1978

[51] Int. Cl.² .................................................. F24J 3/02
[52] U.S. Cl. .................................... 126/438; 126/425; 126/442; 126/441
[58] Field of Search ............... 126/270, 271, 452, 438, 126/439, 441, 450, 442, 443, 425; 237/1 A

[56] References Cited

U.S. PATENT DOCUMENTS

| | | | |
|---|---|---|---|
| 4,004,574 | 1/1977 | Barr | 126/271 |
| 4,029,081 | 6/1977 | Strong | 126/271 |
| 4,038,972 | 8/1977 | Orrison | 237/1 A |
| 4,065,053 | 12/1977 | Fletcher et al. | 126/271 |
| 4,078,547 | 3/1978 | McKeen | 126/271 X |
| 4,098,019 | 7/1978 | Strong | 126/271 |

OTHER PUBLICATIONS

"There's No Fuel Like an Old Fuel", pamphlet of Suntec Systems, Inc. of Lakeville, Minnesota, 55044.

*Primary Examiner*—Carroll B. Dority, Jr.
*Assistant Examiner*—Larry Jones
*Attorney, Agent, or Firm*—Charles W. Swope

[57] ABSTRACT

A solar energy utilization system employing a glazed, insulated, collector box that houses a plurality of swingably mounted, conduit type, energy absorber assemblies; together with associated, arcuately shaped booster mirrors for collecting solar rays and reflecting them toward the absorber assemblies; and in which each absorber assembly includes an absorber tube provided with surrounding, overlapping, cylindrical baffles that may be said to function like iris diaphragms to control an aperture which receives the reflected rays.

7 Claims, 11 Drawing Figures

COLLECTION AND UTILIZATION OF SOLAR ENERGY

BACKGROUND OF THE INVENTION

1. Field of the Invention

The present invention is concerned with the effective utilization of solar energy and, particularly, but not exclusively, with improvements in the type of solar energy collecting and distributing systems that circulate a gas (preferably air) rather than a liquid (usually water) to carry heat to storage or use. In that connection, it expands the merit of applicant's earlier application that matured into U.S. Pat. No. 4,029,081, granted June 14, 1977, and entitled "Solar Energy Transport System".

2. The Prior Art

Newkirk's "Flat Plate Solar Collector Handbook" and Mayall's "Applied Solar Energy" may be said to epitomize the art from which applicant's patent and the present invention have emerged. Thus, Newkirk says, inter alia:

"Flat plate solar collectors... are capable today of meeting the thermal energy needs for many types of systems such as domestic hot water heaters and building space heaters. This technology is considered to be immediately applicable for general us..."

The Mayall book gives much the same picture, and both set forth what have been considered disadvantages of a system that circulates air instead of water, i.e., that "more energy is required to move air than to move water", "duct work is relatively expensive and space consuming", and "the control system for air is more expensive than for water because the duct size is larger".

In any event, however, the first of these is overly optimistic, and a program recently sponsored by Northeast Utilities found performance of flat plate collectors far less than predicted because the prediction was based on pyrheliometer measurements of solar insolation, and the over-prediction was a consequence of inappropriate interpretation of the measurements.

To explain, only that radiation from the sun (insolation) can be properly counted which has an intensity and duration sufficient to bring the flat-plate absorber to a temperature—a source temperature—that is substantially above the use temperature—a sink temperature—to transfer energy. This is the general necessary condition for heat transfer. Thus, depending on the nature of use, when the sun is dimmed by atmospheric absorption, as at low solar altitudes; by haze or cirrus clouds, or by smog, so that the flat-plate temperature is not substantially above the intended use temperature—90° C. (for storage in a sensible-heat storage facility); 65° C. (for heating domestic water supply); 25° C. (for heating living space); or the temperature of tap water (for pre-heating water for a conventional hot water system)—then the insolation must not be counted.

SUMMARY OF THE INVENTION

According to the present invention there is provided a method and apparatus, for use in a system of collecting, utilizing and distributing solar energy which, with the cut-off limits discussed above, allows transfer of heat for the several uses mentioned, even when insolation is dimmer than that which a flat plate collector would require, by factors ranging from 3X (for morning or afternoon) to 20X (at solar noon).

An important object of the invention is to achieve this improvement by the use of booster mirrors to concentrate the flux on absorbers that have much reduced surface area and a baffle-iris around them.

Another object is to provide an absorber surface of decreased heat capacity that makes it 5-fold faster in response.

Another object is the provision of a solar energy collecting apparatus that, when cold, requires much less solar exposure to bring it into operation.

Further objects and advantages will become apparent in the course of the following description, when taken in connection with the accompanying drawings.

BRIEF DESCRIPTION OF THE DRAWINGS

In the drawings, wherein like numerals refer to like parts throughout.

DESCRIPTION OF A PREFERRED EMBODIMENT

Figure 1:
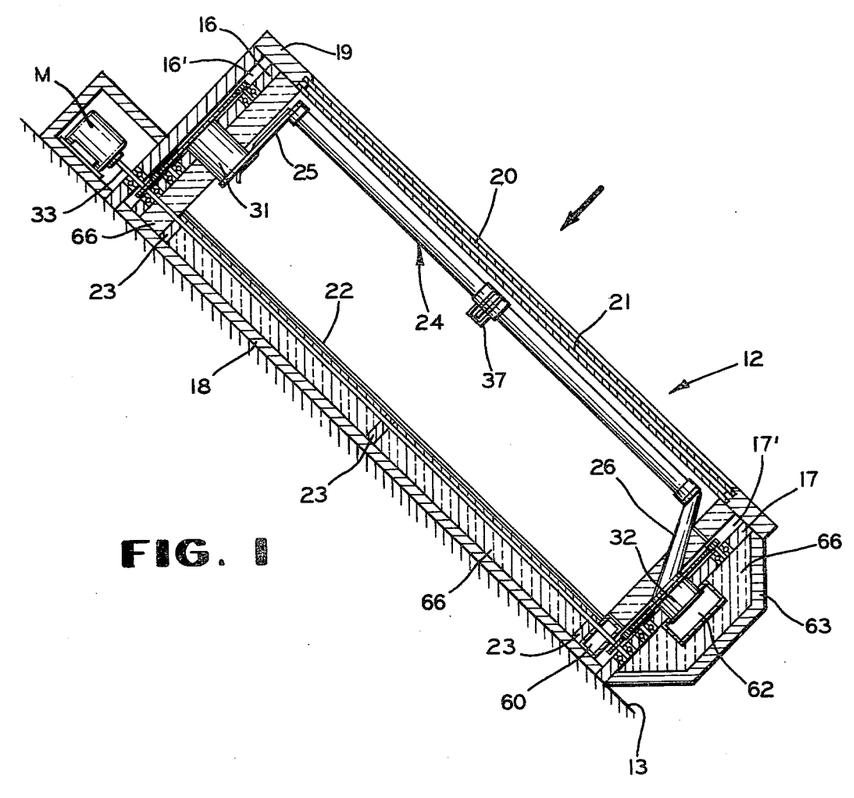
FIG. 1 is a vertical, transverse, sectional view of a so-called collector box, constructed in accordance with the invention, and located in operative position with its open or glazed side facing south.

Referring now more particularly to the drawings, the collector box 12 illustrated in FIG. 1 is intended for use in heating water or for domestic space heating. As such, it may be relatively small and, as shown, be mounted on the roof 13 of a house or other building in the northern hemisphere, facing south, at an angle to the vertical, and connected to suitable conduits leading to use and/or storage areas.

Specifically the box 12 is generally rectangular, having end walls 14 and 15 (FIG. 3), side walls 16 and 17, a bottom wall 18 and an open top which is closed and glazed by a double pane window unit made up of a frame 19 carrying spaced sheets of tempered glass 20 and 21. The walls of the box are lined with insulating material such as "Thermax" which, in 1-1/4" thicknesses, has a thermal conductivity of only 0.13 BTU per square foot, per hour, per °F.

Figure 2:
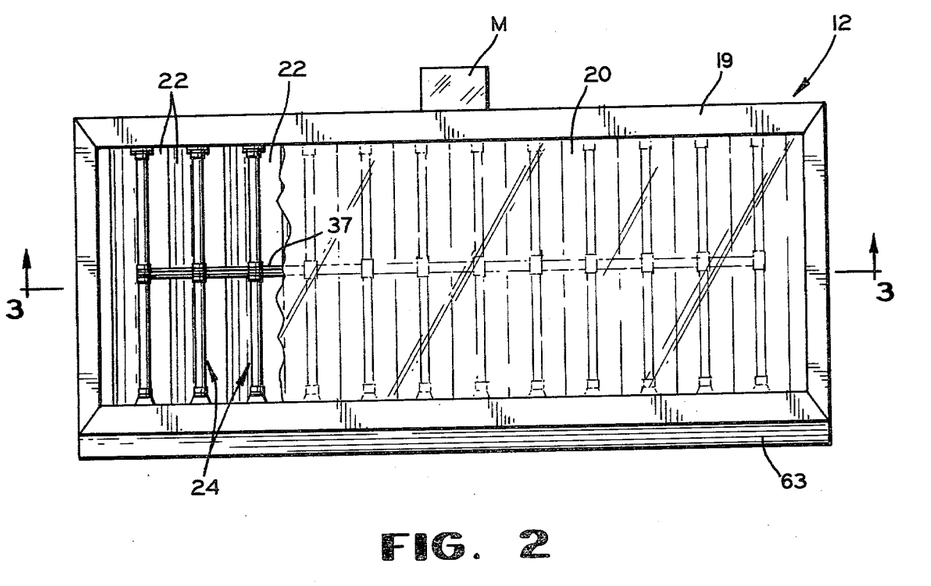
FIG. 2 is a face or plan view of the collector box, looking in the direction of the arrow in FIG. 1, and with a part of the glazing of the open side broken away.
Figure 3:
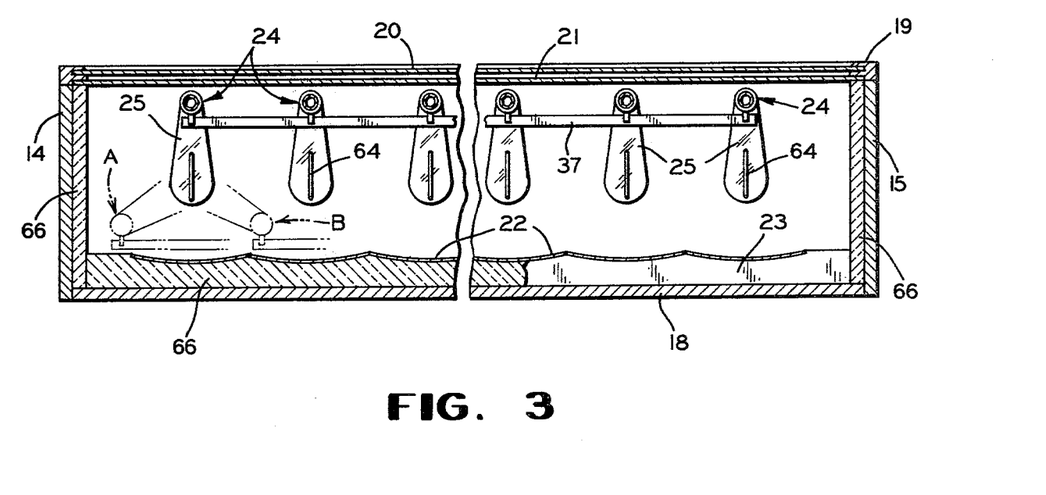
FIG. 3 is a longitudinal, sectional view taken substantially along the line 3—3 in FIG. 2.

The insulation lined bottom wall 18 of the box is covered by twelve arcuately shaped mirrors 22, each of which is 6" wide and may be formed from a flat sheet of thin aluminum bent to have a 15" radius of curvature, i.e., as if it were a 6 inch segment of the circumference of a cylinder of 15 inch radius. These twelve mirrors, which have bright concave reflecting surfaces, are mounted just above the insulation lining the bottom 18 of the collector box on three spaced contoured strips 23 (FIGS. 1 and 3), and each mirror acts to receive rays of the sun entering the box through its glazed open top and to reflect and concentrate solar flux on an associated, conduit type absorber assembly 24 above and parallel therewith (FIGS. 2 and 3). The twelve absorber assemblies are each carried for swinging movement transversely of their associated mirrors 22 between positions A and B (shown in broken lines in FIG. 3) by supporting arms 25 and 26.

This is so that, as the sun moves across the sky, the absorber assemblies 24 can be moved or swung so as to track the movement of the line-images of the sun that the mirrors form. As compared with a static, flat-plate absorber, it may seem that this sort of dynamic type will come even farther from meeting the severe cost restraints on solar energy applications. However, as will be apparent hereinafter, better performance and doubtful higher first costs make the structure of this invention practical—with acceptable pay-back times.

Figure 4:
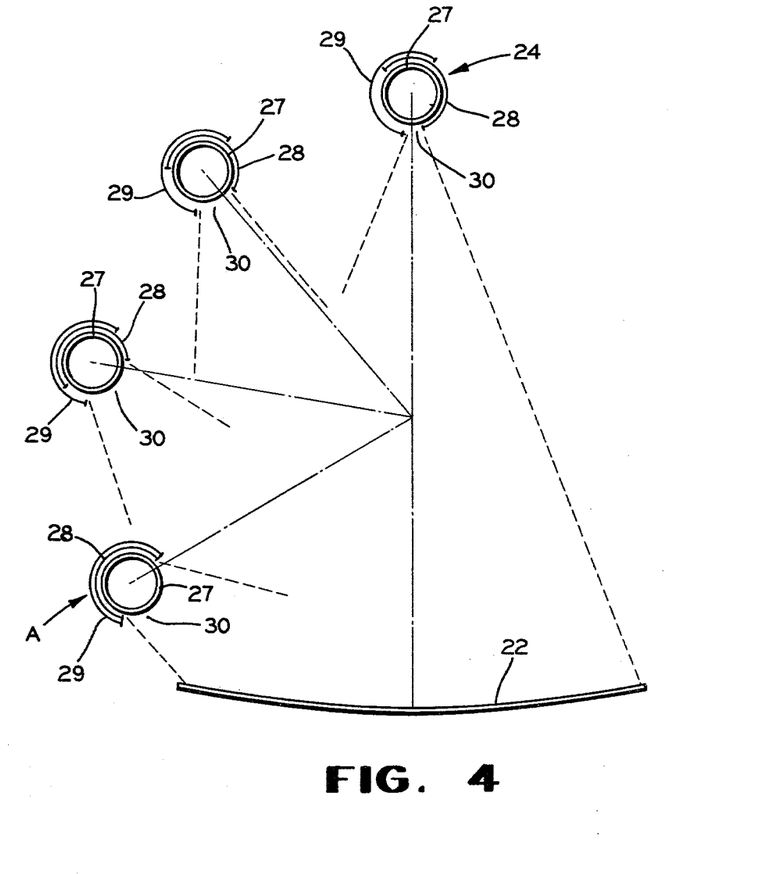
FIG. 4 is an enlarged diagrammatic view showing the relationship between one of the booster mirrors of FIG. 3 and its corresponding absorber assembly at spaced intervals before solar noon.
Figure 5:
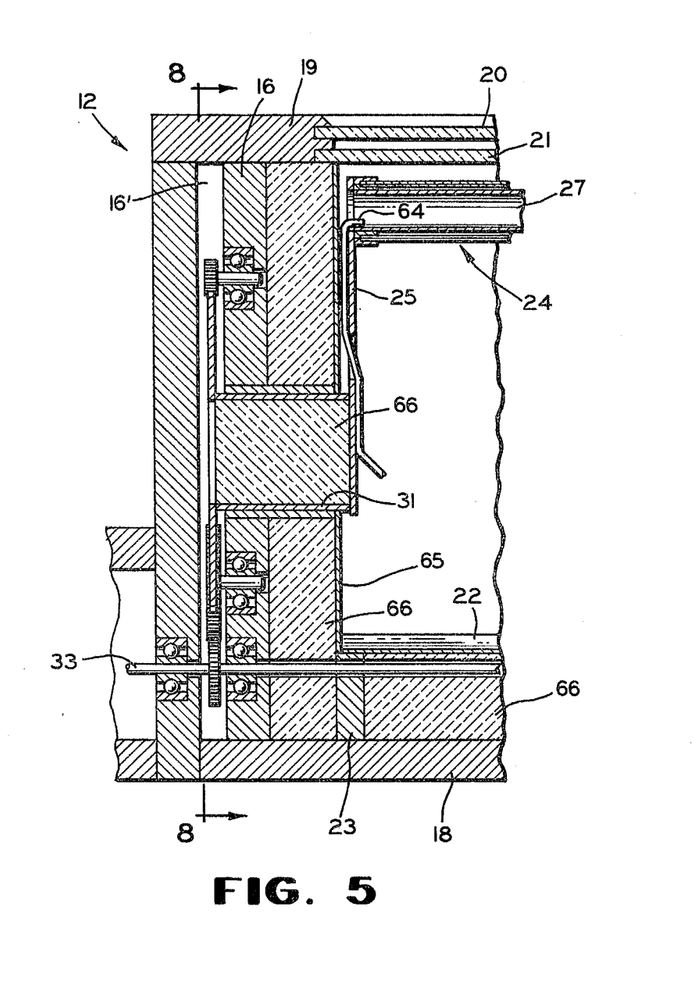
FIG. 5 is an enlarged, detailed, sectional view of the north or upper end of the collector box as shown in FIG. 1.

The improved performance of the present dynamic absorber system is practically achievable owing to several propitious circumstances illustrated by FIG. 4, which also illustrates, diagrammatically, the cross-sectional structure of the absorber assemblies 24. Thus, as can best be seen from this figure, and from FIGS. 9 and 10, each absorber assembly comprises a blackened absorber tube 27 having two open sided, cylindrically shaped baffles 28 and 29 in concentric surrounding relation thereto. The open sides of these baffles overlap to form a longitudinal slot-type aperture or iris opening 30 and the baffles are operable, in a manner to be hereinafter explained, to vary the position and width of their iris opening and to properly orient it for the different insolation incidence angles depicted in FIG. 4.

Specifically, FIG. 4 is a diagrammatic section through one of the cylindrical, booster mirrors and its associated absorber assembly. This section, looking north, lies in the plane of the sun's ecliptic. It indicates, in dotted lines, the bounds of the ray traces for the reflected flux from all of the mirror, for the morning sun, at the times: $4^{hr}$; $2^{hr} 40^{min}$; $1^{hr} 20^{min}$ —before solar noon; and for solar noon; together with a diagrammatic sectional depiction of the absorber assembly as positioned for each of these times and with the first, or early morning position, being designated A. The ray traces will, of course, be intermediate for intermediate times; and they are the same for equivalent hour-angles before and after solar noon.

To swing the absorber assembly into, out of and through the various positions illustrated diagrammatically in FIG. 4 and between the starting-morning and afternoon-terminal positions designated A and B respectively in FIG. 3, the flat arms 25 and hollow arms 26 that support and carry the tube assemblies are provided with hollow shafts 31 and 32 respectively that are journaled in the side walls 16 and 17 of the box 12 and are driven, through suitable trains of gears, mounted in compartments 16' and 17' associated with the side walls 16 and 17 (FIGS. 1, 5, 6 and 8), by a drive shaft 33 from a reversible synchronous motor M (FIG. 1).

Each of the inner and outer cylindrical baffles 28 and 29 has a circumference of 210° which means that it is capable of reaching around or covering all but 150° of the outer surface of its absorber tube and, as illustrated in FIG. 4, at the extreme position A the baffles overlap each other fully to provide an iris opening 30 that is of maximum width at the beginning of the day; but move progressively from this completely overlapping position, as the day progresses, until they provide an iris opening of minimum width at solar noon, and then reverse their movement so that at the end of the day (shown at B in FIG. 3) they again reach their fully overlapping position and wide iris opening.

This relative rotary movement between the baffles 28 and 29 during swinging of the absorber assemblies from their A (morning) to B (evening) positions is made possible by carrying each of the inner baffles 28 on rings 34 (FIG. 9) that are mounted for rotation on the absorber tube of the assembly and by having each of the outer baffles 29 carried by rings 35 that are mounted for rotation on the rings 34. The relative baffle movement may be accomplished by means of a control bar 37 (FIGS. 2, 3, 9 and 10), "U" shaped in cross section, that extends parallel with the longitudinal center line of the box 12, below and transversely of the absorber assemblies 24. This bar is supported by means of a pin 38 (FIGS. 8 and 9) carried by a tab 39 depending from a "Teflon" collar 40 that separates the circular baffles 28 and 29 of each assembly into two sections.

Figure 9:
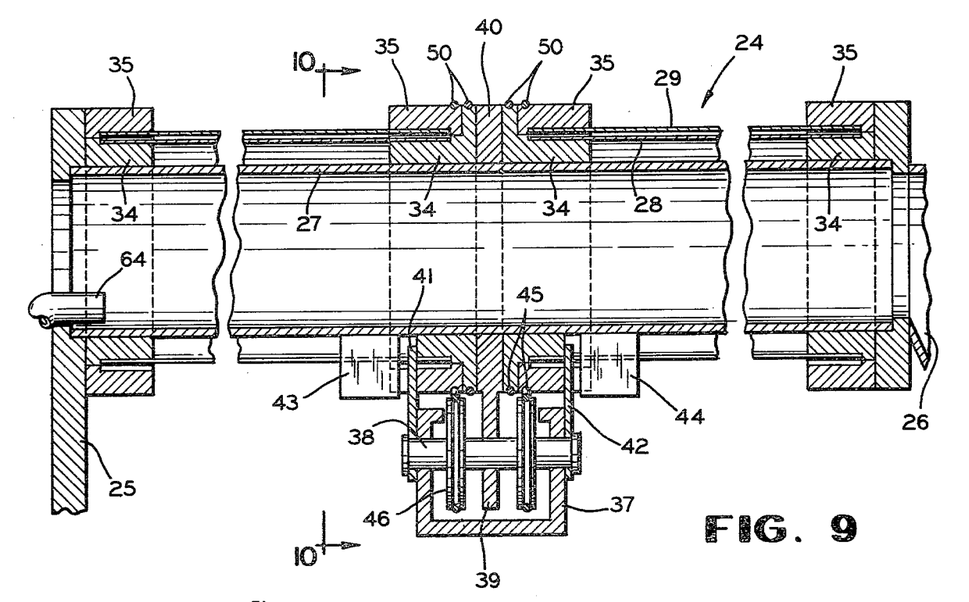
FIG. 9 is an enlarged, detailed, longitudinal, sectional view of the ends and middle portion of one of the absorber assemblies, showing its connection to the iris control bar.
Figures 10, 11:
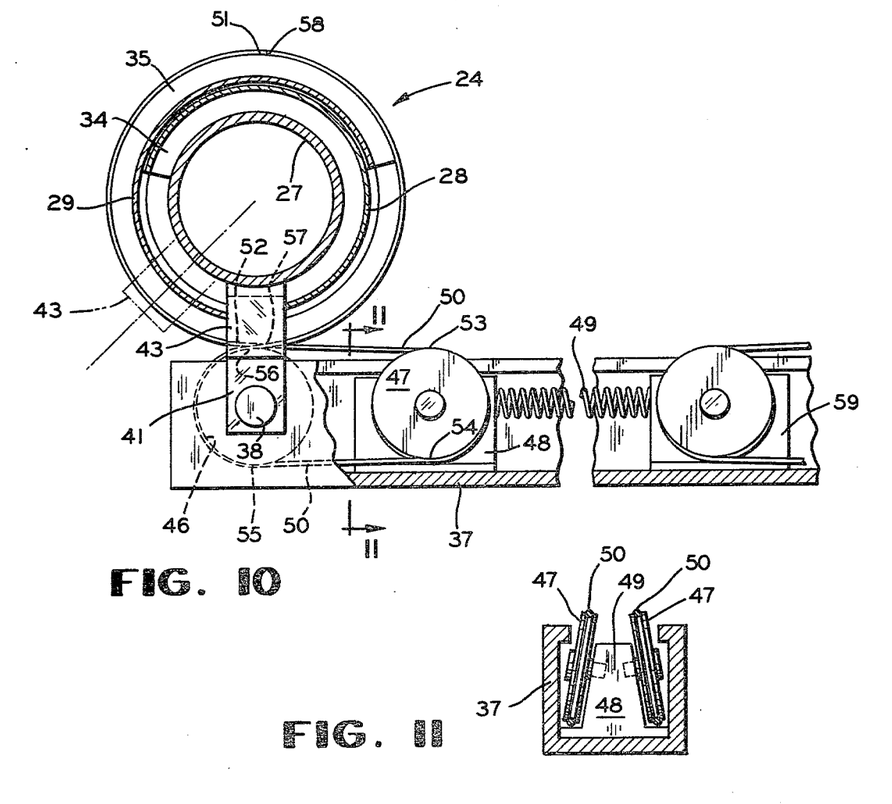
FIG. 10 is a transverse, sectional view taken substantially along the line 10—10 in FIG. 9.
FIG. 11 is a vertical sectional view, taken substantially along the line 11—11 in FIG. 10, and showing the pulley controls.

Both of the central inner rings 34 that support and carry inner baffle 28 of each assembly, and the outer central rings 35 that carry outer baffles 29 have cutbacks in their flanges that coincide with the 150° to which the 210° baffle sectors do not reach. FIGS. 9 and 10 show how the ends of these cut-backs are in line to bear on two iris driver pawls 41 and 42 which are fixed to the control bar 37 or to bear on two iris locator pawls 43 and 44 which are fixed to the absorber tube 27. The iris-driver pawls and the iris-locator pawls are each ¼ inches wide, to correspond to the iris opening for solar noon. The tab 39 that supports the bar 37 is also ¼ inches wide, and these pawls and the tab all coincide at solar noon as shown in FIG. 10.

The driver and locator pawls, 41-42, and 43-44, push against the ends of the cut-backs in the flanges of the rings, 34 and 35, to establish positive location, but when the arms 25 and 26 return from either side to the noon position the driven sectors of the baffles must be impelled to maintain contact with the retracting pawls. This is accomplished by means of the spring-loaded pulleys that are shown in FIG. 11.

Grooves 45 are cut in the inner rings 34 and 35 (FIG. 9) located at opposite sides of the collar 40 to provide pulleys that are belted, together with two fixed pulleys 46, to two retractable pulleys 47, by two belts 50 (FIGS. 9, 10 and 11). The fixed pulleys 46 are mounted for rotation on the pin 38 and the retractable pulleys 47 are mounted, inclined, to a retractable shoe, 48, that is spring-loaded at the point, 49.

The two belts 50 may be of linen fishing line. They are threaded as follows: One end of each is fixed at the points 51 on each of the pulley grooves in the rings 34. These lines are similarly threaded: each running counter clockwise around in its pulley groove to leave it at the points 52. Each then goes to 53 on the spring-loaded pulleys, 47; and, half around them, to points 54, thence to points 55 on the fixed pulleys 46; half around the latter, from points 56, the belts cross to the pulley grooves in the rings 35 that support the outer baffles 29, at points 57. Finally, half around the rings 35, the belting is fixed at the points 58—adjacent to points 51. Both beltings 50 are of the same length. Thus a spring tension on the shoe, 48, by a prestressed helical spring attached to it at the point, 49, impells both baffle-iris sections 28 and 29 to close until they are restrained either by the locator pawls, 43 and 44, or by the driver pawls, 41 and 42. One end of the impelling, pre-loaded helical spring is connected to the shoe 48 as shown, at 49; the other end, to the corresponding show 59 of the next, adjacent baffle rotating assembly. Thus, six helical springs serve all twelve of these baffle operating assemblies.

Any suitable air flow system, including necessary blowers, ductwork and the like, can be provided to circulate air through the absorber tubes 27 and exhaust it from their south or lower ends toward and into desired use or storage areas. For example, forced air may be fed from an available source into an intake manifold 60 running along the lower or south side of the box 12 (FIG. 6 and 7) and be vented into the interior of the box through a series of holes 61. Air from the interior of the box will thus be supplied to the absorber tubes 27 through their open north or upper ends, to circulate downwardly through, picking up heat from, the absorber tubes and exhaust through the hollow arms 26 and shafts 32 into an exhaust manifold 62 contained in an extension 63 outside the box 12, and from which the heated air can be delivered to use and/or storage.

Along with the air circulation, water is delivered to the open upper ends of each absorber tube 27, from a pipe 64 carried by the flat arm 25, and flows or trickles downwardly through the absorber tube toward the exhaust manifold 62, during which time the solar energy absorbed by the tube evaporates it into the circulating air. This makes possible the combining of the advantages of the air-vapor medium heat transport system of U.S. Pat. No. 4,029,081, the merits of which are epitomized in Table I below, with those of the improved collecting, reflecting and absorbing system just described.

Table I

| 1<br>Absorber<br>Temperatures<br>(°F.) | 2<br>Transport<br>Burdens<br>(cal.per cu.ft.) | 3<br>Gain<br>Factors<br>G | 4<br>Condensates:<br>gm.per cu.ft.<br>of circulation | 5<br>Ducting<br>Dimension<br>Decreases<br>$\sqrt{G}$ |
|---|---|---|---|---|
| 194 | 8830 | 24.3 | 11.5 | 4.9 |
| 176 | 5700 | 18.6 | 7.7 | 4.3 |
| 158 | 3640 | 14.8 | 4.8 | 3.8 |
| 140 | 2140 | 11.8 | 2.8 | 3.4 |
| 131 | 1560 | 10.7 | 2.0 | 3.3 |
| 122 | 1060 | 9.5 | 1.4 | 3.1 |
| 104 | 300 | 7.8 | 0.4 | 2.8 |

In the table, Column 1 lists various absorber temperatures. These are the source-temperatures (temperatures above use) for heat transfer. Here the sink-temperature (to transfer energy) in this example is assumed to be 95° F.

Column 2 lists corresponding burdens of heat that are carried by one cubic foot of the air-vapor circulation. The transport medium is saturated at the source-temperature by water that is evaporated by the absorbed solar energy. And this water vapor condenses at the sink-temperature. The burdens of heat transported by one cubic foot of circulation are expressed in gram-calories.

Column 3 lists ratios of this burden to the burden of heat that would be transported without vapor involvement—by sensible heat alone. These ratios are gain factors that the practice of the patented invention provides. The loss of heat that is occasioned by wasting the condensate at tap-water temperature (assumed: 59° F.) has been taken into account in calculating the values listed in columns 2 and 3.

Column 4 lists the amount of liquid water (in grams) that is evaporated, and condensed—for each cubic foot of air-vapor circulation.

Column 5 lists square roots of the gain factors of column 3, giving the factor by which ducting diameters (or dimensions) may be reduced. These reductions mean that insulation can be made more effective—also involving smaller installation costs. And further, the column 3 gains mean that the blower capacity required to motivate the circulation is reduced by an order of magnitude.

The objects, referred to in the summary of the invention above, are achieved by the arcuate booster mirrors 22 concentrating the flux on black coated absorbers 27 that have much reduced surface area, relative to an equivalent flat absorber, and by the baffle-irises 28–29 around them that retro-reflect most of their infrared emission. Selective black coatings are desirable and practical here since the surface to which they are applied has a much reduced area, the absorber area reduction, relative to an equivalent flat absorber, being by a factor $(8/\pi)$. This smaller area allows a two-fold reduction in absorber thickness, from the usual 1/16 for flat absorbers to 1/32 inches, and the two factors, together, decrease the heat capacity of the absorber surface to make it 5-fold faster in response.

Sunlight is often intermittent—as when the sun is periodically shadowed by clouds floating across a blue sky. Under these circumstances, compared with a flat-plate collector temperature, the present structure with its 5-fold faster response time, will rise substantially above the use-temperature for a very much greater fraction of the insolation that pyrheliometer's measure. Consequently circumstances occur more often when this faster collector can deliver useful heat and, when it gets cold, as at night, much less solar exposure is required to bring it into operation.

Also, when all of the reflected rays from the booster mirrors 22 are absorbed by the tubes 27, the effective concentration of flux is approximately 2-fold: $(6-1)/0.75 \pi = 2.1$. This is the ratio of the surface area of each booster mirror (less obstruction by its associated assembly 24 which is of 1 inch diameter) to the surface area of the tube 27 which is $3\pi/4$ inches.

This concentration-of-flux factor, G, is considered as a gain factor—it means that twice the insolation flux is required for a flat-plate absorber to reach the tube absorber temperature; and, as will be shown later, the baffle-iris makes the effective concentration of flux even greater—estimated as varying from G=19.8 at solar noon to 3.1 at H.A.=±4 hr.

As previously stated the several propitious, enabling, optical and geometrical circumstances that make the better performance of the structure of this invention achievable are illustrated in FIG. 4., and the first of these is that the ray traces are the same when the sun is not on the ecliptic, but higher, as in summer; or lower, as in winter. For these declinations, the line focus of the cylindrical mirror shifts longitudinally—proportional to the tangent of the sun's declination—but the projection of rays onto the ecliptic plane are the same as FIG. 4 shows.

The second, is that the paraxial rays—those rays that are reflected near the median of the mirror 22—focus as a line image on a cylinder that has a diameter equal to half of the focal length of the mirror. This cylinder osculates the mirror.

The third, is that this line focus moves about on the circumference of this cylinder at a uniform angular rate of 30° per hour—that rate is just twice the angular rate at which the sun traverses the sky.

The fourth, is that the cylindrical ray-abberations are such that the baffles 25 and 26 can be conveniently and automatically moved to form appropriate iris openings, at the proper place and of the proper width, to accept all of the reflected and abberated rays.

The mechanical consequences of the second and third enabling, optical-geometrical circumstances are that the timekeeping facility inherent to alternating electrical supply can be used here for a programmer that will control the synchronous motor M. This reversible synchronous motor, which, as previously explained, is adapted, when properly geared down, to move the assemblies 24 so that they acquire and track the sun's images, swings the assembly's arms 25 and 26, (radius 3¾ inches) about on the osculating cylinder referred to above at 30° per hour.

The programmer, from time to time, must be set to solar time, rather than to civil time. This is because electrical power follows civil time. This inconvenience can be avoided by making the programmer more complex; but, since the programmer will need to be re-set only every few days, it may be done manually. The difference between solar time and civil time is called "The Equation of Time". Tabulations of the correction are readily available from a number of references, such as almanacs. The corrections display two maxima and two minima in the course of a year. The largest maximum is +16 ⅓ minutes, the greatest defect is −14 ⅓ minutes.

The programmer serves by giving the synchronous motor the following commands.

It stops tracking at H.A.=+4$^{hr}$, (shown at B in FIG. 3) and immediately reverses the synchronous motor to return the assemblies, 24, to their appropriate starting positions for the following morning at 4$^{hr}$ before solar noon (A in FIGS. 3 and 4). The programmer then rests the synchronous motor until that next starting time. At the next starting time, regardless of whether the day is cloudy or not, tracking is commenced at exactly H.A.=−4$^{hr}$, and it is continued for the ensuing 8 hours. Then the cycle repeats.

Because, to dissipate absorbed power, the absorber must get hotter if its area is smaller, we call the concentrations-of-flux factor a gain factor, G. Or, conversely, the absorber will come to a given temperature with an absorbed power that is proportionally less. The gain factors of 19.8 to 3.1, mentioned above, are greater than the virtual gain that we calculated above: 2.1. This was calculated on the assumption that all of the reflected rays were absorbed by the tube. Greater gains arise by virtue of the baffle iris: Reflected rays that are admitted by the iris opening but not directly absorbed by the black tube, are reflected by the inner surfaces of the baffles, which are bright, and then absorbed by the tube. Also these bright inner baffle surfaces retro-reflect the infrared emission of the black surface. In short, the baffle-iris makes re-emission of absorbed insolation substantially as if the absorber area were equal to the iris opening.

The iris opening at the solar noon must take account of several factors: account of the finite width of the sun; account of cylindrical abberation, which swells the image by a blur; and account of blur due to imperfections of manufacture of the mirror—this is ½° or less—due to erratic mirror surface tips. All together, these yield a total width of 0.25 inch. This ¼ inch iris opening subtends the angle: $2 \sin^{-1} 0.25 = 29°$. As FIG. 4 shows, one side of the iris opens at the angular rate: 30° per hour. One jaw—the one of the noon side—remains at its noon position; the other opens at the rotation rate—30° per hour. Thus, at H.A.=t, the circumferential iris opening (taking the absolute value of t) is $$\frac{(29 + 30t)°}{360°} \pi \text{ inches.}$$

The estimated gain factors at various hour angles for the sun's position are given in Table II below—calculated from:

$$(6 - 1) \div \frac{(29 + 30t)}{360} \pi = G.$$

In the third column, these factors have been corrected for shadowing of the mirrors (on the east side of the box in morning and on the west side, in afternoon). This shadowing is more severe than for flat-plate collectors because the mirrors are deeper behind the box window—being 8¾ inches behind it in the present instance. There is no shadowing, here, for 1½ hours at noon. G' gives corrected gain factors.

No shadowing correction is necessary as the sun's declination moves north and south of the ecliptic: Flat reflectors 65 on the inside surfaces of the insulations of the north and south inside ends of the collector box reflect insolation that would miss the mirrors, 22, back onto them.

Table II

| Sun's position | G | G' |
|---|---|---|
| 0$^{hr}$ | 19.8 | 19.8 |
| ± 1$^{hr}$ | 9.7 | 9.6 |
| ± 2$^{hr}$ | 6.4 | 6.1 |
| ± 3$^{hr}$ | 4.8 | 4.3 |
| ± 4$^{hr}$ | 3.9 | 3.1 |

The 5-fold faster response time merit is significant when the insolation is intermittent, or variable—the merit is a result of less copper in the absorber tube than in an equivalent flat-plate: $3\pi/4$ as against 6, or 2.5-fold (for area); and 1/32 as against 1/16, or 2-fold in reduced thickness—a total difference of 5-fold. Also, for an absorber temperature of 194° F., the vapor sensible heat capacity is again 5-fold less than the heat capacity of the liquid water that is necessary to carry the same heat burden.

In summary: The available insolation data, from pyrheliometer measurement yields, has been misleading—as experience has sadly shown. This error of interpretation arises because insolation that is either too much dimmed by haze, cirrus and smog; or that is of too short duration, due to interruption by floating clouds to bring tha flat-plate absorber to a temperature where it can deliver heat to the intended-use site, must not be counted as available. This mis-interpretation is severe except for geographical regions which are fortunate to have abundant, uninterrupted exposure to the sun. Payback times for flat-plate collectors are too long even when the pyrheliometer data are not mis-interpreted.

On the other hand, the structure of this invention with its gain factors of 3.1 to 19.8, and 5-fold quicker response, reduces the fraction of the available solar energy that must be clipped off because it cannot deliver useful heat for intended purposes.

Also, one of the defects of ordinary air transport systems is that the heat must be driven across a boundary layer resistance. This boundary layer resistance is largely absent in the system of the present invention, where the major fraction of the heat burden inheres in the latent heat of evaporation, because this burden is invested in the transfer medium at the very surface. in fact, if the absorber boils the water flowing through it, heat is transported with substantially no super heat requirement.

Further, a storage facility is desirable for a solar-energy-application installation since the sun generally shines brightest when its energy is least needed. Extant facilities that store energy, as the sensible heat of liquid water, usually have a temperature working range: 90° to 130° F. With this improved system, water can be heated to 210° F.; and thus, a particular storage system can be worked over the range: 90° to 210° F.—and store 3-fold more energy. The typical seasonal requirement for a dwelling located at 45° latitude is 100 million BTU. An insulated cistern of 11 foot diameter, with the storage water in it 11 feet deep, having a capacity of 7,800 gallons, will store 7.5 million BTU, with the larger working range. Such a cistern, charged in summer and fall, would go into the heating season with a substantial fraction of the seasonal requirememt; and energy drawn away from it later could be replaced as insolation was available in winter. Without such a storage facility, the evaluation of available insolation measurements subjects them to a further, severe truncation.

Figure 6:
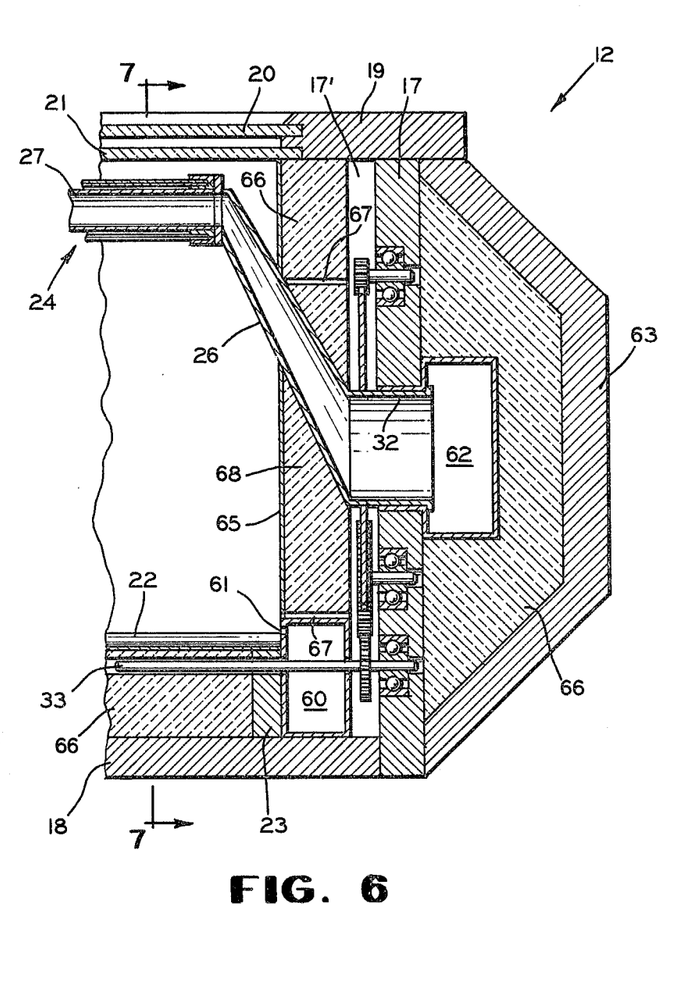
FIG. 6 is an enlarged, detailed, sectional view of the south or lower end of the collector box as shown in FIG. 1.
Figure 7:
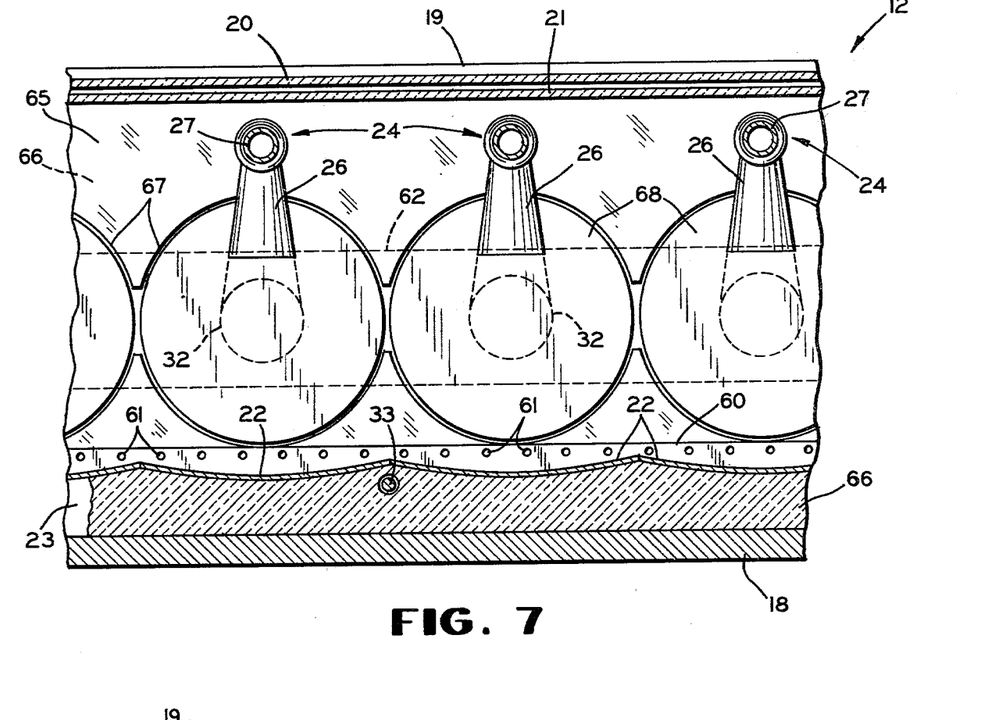
FIG. 7 is a partial, longitudinal sectional view from inside the collector box of FIG. 1, taken substantially along the line 7—7 in FIG. 6, and showing three of the absorber assemblies in their noon positions.
Figure 8:
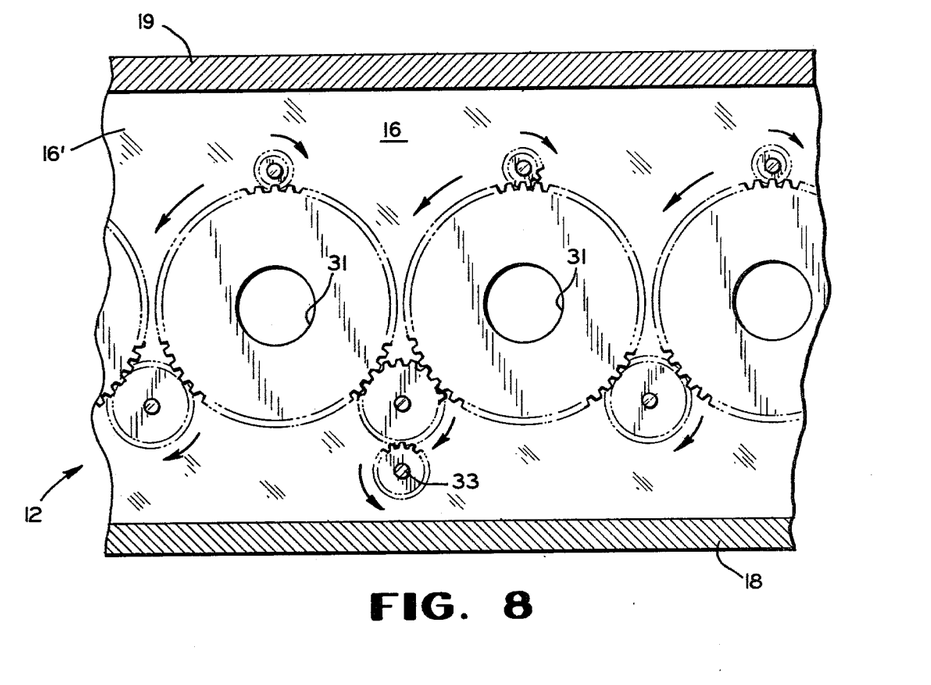
FIG. 8 is a partial, vertical sectional view, taken substantially along the line 8—8 in FIG. 5, and showing the gear train for effecting tracking movement of three of the absorber assemblies back and forth between their morning and evening positions.

Finally, to prevent heat loss from the interior of the box 12, its end, side and bottom walls are, as has already been indicated, lined with sheets of insulating material. This insulation (designated 66) may, as shown in FIGS. 6 to 8, be provided with cut-outs 67 to accommodate the intake manifold 60, contoured strips 23 that support the booster mirrors, and the hollow shafts of the flat swinging arms 25 and the hollow swinging arms 26. However, the effects of such cut-outs are offset by filling the hollow shafts 31 of the arms 25 with the same insulating material, and by locating discs 68 of the insulating material in surrounding relation to each of the arms 26 for rotation within their respective cut-outs. Also, in addition to the flat reflectors 65 on the inside surfaces of the insulating material lining the north and south or side walls of the box, similar flat reflectors are provided on similar surfaces of the insulation material lining the end walls 14 and 15.

It is to be understood that the form of the invention herewith shown and described is to be taken as an illustrative embodiment only of the same, and that various changes in the shape, size, composition, structure and arrangement of parts, as well as various procedural changes may be resorted to without departing from the spirit of the invention as defined in the following claims.

I claim:

1. In a method of utilizing solar energy in which the sun's rays are received on an elongated reflecting surface located transversely of the path of daily movement of the sun across the sky, and said rays are reflected from said surface to direct rays through a variable aperture in a housing surrounding a conduit type absorber that is substantially parallel with said reflecting surface and to concentrate said rays as a linear image along said absorber; the improvement which comprises maintaining and continuing said directing and concentrating actions during selected daylight hours by swinging said housing and absorber from a starting position at one side of said reflecting surface toward the other side thereof through said selected hours to track the movement of said linear image during said hours, and adjusting said aperture to accommodate the changing insolation angles and linear image width resulting from said movement of the sun during said selected daylight hours.

2. A method as defined in claim 1, in which said adjusting step involves positioning said aperture to accommodate changes in the angles, and varying the size of said aperture to accommodate changes in said insolation said linear image width.

3. A method as claimed in claim 2, in which said swinging movement of said housing and absorber is utilized to position and vary the size of said aperture.

4. A method as defined in claim 3, in which said rays are directed through an aperture in a housing for said conduit type absorber that is formed by a pair of slotted cylinders mounted concentrically of said absorber for rotation relative thereto, said aperture is adjusted by rotating one of said cylinders to reduce the size of said aperture during forenoon hours and by rotating the other of said cylinders to increase the size of said aperture during afternoon hours, and said housing and said absorber are returned to their starting position after said selected daylight hours.

5. A method as defined in claim 1, in which a gaseous fluid is directed through said absorber to receive heat therefrom, and a liquid is introduced into said absorber in the path of said gaseous fluid.

6. In an apparatus for utilizing solar energy; a plurality of absorber assemblies each comprising a black absorber tube for receiving and absorbing heat from rays of the sun, and baffle means comprising a pair of slotted, overlapping coaxially mounted cylinders mounted concentrically of said tube for bodily movement therewith and for rotary movement about the axis of the tube to form a variable width aperture through which said rays reach said tube; means for moving said cylinders relative to one another and to said absorber tube to control the size and position of said aperture; an arcuately shaped elongated booster mirror having a focal plane and focal line, said focal line lying substantially parallel with the absorber tube of each of said assemblies, said mirror collecting rays of the sun reflecting and concentrating them toward and through said aperture and concentrating linear images thereof on said tube; means mounting said plurality of absorber assemblies for swinging movement in arcuate paths in a plane substantially perpendicular to the focal line of the reflector; means for swinging said assemblies in one direction within said arcuate paths in timed relation to the movement of the sun; a glazed and insulated box within which said swingable absorber assemblies and said mirrors are mounted in angular relation to the daily movement of the sun across the sky; and means for flowing a fluid through said black absorber tubes.

7. Apparatus as defined in claim 6, in which said means for moving said concentrically mounted slotted cylinders of said pair includes means actuated by swinging movement of said assemblies for rotating one of said cylinders relative to the other and to said tube during forenoon hours and for rotating the other of said cylinders relative to the first named cylinder and to said tube during afternoon hours.

* * * * *

UNITED STATES PATENT AND TRADEMARK OFFICE
CERTIFICATE OF CORRECTION

PATENT NO. : 4,217,884

DATED : August 19, 1980

INVENTOR(S) : John D. Strong

It is certified that error appears in the above-identified patent and that said Letters Patent are hereby corrected as shown below:

Column 10, line 29, cancel "the" and insert --said insolation--; line 30, cancel "said insola-"; line 31, cancel "tion".

Signed and Sealed this

Twenty-fifth Day of November 1980

[SEAL]

Attest:

SIDNEY A. DIAMOND

Attesting Officer

Commissioner of Patents and Trademarks